(12) United States Patent
Rondinone et al.

(10) Patent No.: US 12,296,817 B2
(45) Date of Patent: May 13, 2025

(54) METHOD AND SYSTEM FOR ACTIVE AND SELECTIVE PREVENTIVE CROSS-FORCE AND NOISE CONTROL IN A VEHICLE

(71) Applicants: Hyundai Motor Company, Seoul (KR); Kia Corporation, Seoul (KR)

(72) Inventors: Michele Rondinone, Frankfurt am Main (DE); Daniel Kaszner, Mainz (DE); Dominik Matheis, Hanau (DE); Thomas Walter, Neustadt a. d. Weinstraße (DE)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 253 days.

(21) Appl. No.: 17/940,721

(22) Filed: Sep. 8, 2022

(65) Prior Publication Data

US 2023/0311851 A1   Oct. 5, 2023

(30) Foreign Application Priority Data

Apr. 5, 2022 (DE) .................. 102022203348.5

(51) Int. Cl.
*B60W 30/00* (2006.01)
*B60W 30/02* (2012.01)
(Continued)

(52) U.S. Cl.
CPC .......... *B60W 30/025* (2013.01); *B60W 40/04* (2013.01); *B60W 50/14* (2013.01);
(Continued)

(58) Field of Classification Search
CPC .... B60W 30/025; B60W 40/04; B60W 50/14; B60W 2556/45; B60W 2554/4045;
(Continued)

(56) References Cited

U.S. PATENT DOCUMENTS 6,813,777 B1 * 11/2004 Weinberger ........ H04N 21/2146
348/E7.071
7,647,180 B2 * 1/2010 Breed ..................... G08G 1/161
340/436

(Continued)

FOREIGN PATENT DOCUMENTS

| DE | 102018112773 | A1 | | 1/2019 |
| DE | 102020108999 | A1 | | 8/2020 |
| DE | 102021201118 | A1 | * | 8/2022 |

*Primary Examiner* — Truc M Do
(74) *Attorney, Agent, or Firm* — Slater Matsil, LLP

(57) ABSTRACT

An embodiment method for active and selective preventive cross-force and noise control in a first vehicle includes determining current driving parameters of a second vehicle that will foreseeably drive by the first vehicle, wherein a prognostic time-dependent path of the second vehicle is estimated based on the current driving parameters of the second vehicle, determining cross-force or noise characteristics caused by the second vehicle, calculating a time window for a drive-by of the second vehicle based on the current driving parameters, determining compensating measures to be taken by the first vehicle to reduce cross-forces or noise expected during the drive-by of the second vehicle based on the determined cross-force or noise characteristics, and executing the determined compensating measures by the first vehicle in the estimated time window.

20 Claims, 4 Drawing Sheets

(51) Int. Cl.
   *B60W 40/04*      (2006.01)
   *B60W 50/14*      (2020.01)
   *G10K 11/178*     (2006.01)

(52) U.S. Cl.
   CPC . *G10K 11/17823* (2018.01); *B60W 2050/143* (2013.01); *B60W 2530/16* (2013.01); *B60W 2554/4045* (2020.02); *B60W 2556/45* (2020.02); *B60W 2710/20* (2013.01); *G10K 11/17873* (2018.01); *G10K 2210/12821* (2013.01); *G10K 2210/3027* (2013.01); *G10K 2210/3044* (2013.01)

(58) Field of Classification Search
   CPC ....... B60W 2050/143; B60W 2530/16; B60W 2710/20; G10K 11/17823; G10K 11/17873; G10K 2210/12821; G10K 2210/3027; G10K 2210/3044
   See application file for complete search history.

(56) References Cited

U.S. PATENT DOCUMENTS

| | | | |
|---|---|---|---|
| 10,510,254 B2* | 12/2019 | Arndt | G08G 1/166 |
| 11,186,223 B2* | 11/2021 | Kang | G06T 7/62 |
| 11,597,379 B2* | 3/2023 | Yoon | B60W 10/20 |
| 2019/0031236 A1 | 1/2019 | Shiraishi et al. | |
| 2020/0156623 A1* | 5/2020 | Takaue | B60K 23/04 |
| 2020/0394907 A1* | 12/2020 | Takamori | B60W 30/02 |
| 2023/0062422 A1* | 3/2023 | Moraca | B60W 40/076 |

\* cited by examiner

METHOD AND SYSTEM FOR ACTIVE AND SELECTIVE PREVENTIVE CROSS-FORCE AND NOISE CONTROL IN A VEHICLE

CROSS-REFERENCE TO RELATED APPLICATIONS

This application claims the benefit of German Patent Application No. 102022203348.5, filed on Apr. 5, 2022, which application is hereby incorporated herein by reference.

TECHNICAL FIELD

The present invention pertains to a method and a system for active and selective preventive cross-force and noise control in a vehicle.

BACKGROUND

Modern cars are increasingly equipped with wireless communication devices, in particular for vehicle-to-everything (V2X) communication, on which basis information may be communicated from a vehicle to any entity that may affect the vehicle or that may be affected by it. Such a vehicular communication system may incorporate other more specific types of communication, in particular V2V communication, that is, wireless vehicle-to-vehicle communication. V2X technology does not only improve traffic flow but may also help to make traffic safer and driving more convenient.

Current vehicles are also more and more connected with sensors and telematics in order to implement advanced driver-assistance systems and/or autonomous driving functionalities. For example, cars may be provided with multiple sensors and various techniques for acquiring data from the environment, e.g., to provide accurate detection of other vehicles, pedestrians, of the road ahead and/or behind, of the weather and so on. Typical technologies that are utilized for this purpose include radar, laser, lidar, infrared, ultrasound, cameras, stereo vision, computer vision, odometry, accelerometers, gyroscopes, GPS, and so on.

Sounds and noise from inside and outside of a vehicle can be annoying for the occupants. Amongst others, the noise level inside a vehicle is often influenced by noise produced by other vehicles driving close by. If, for example, a first vehicle is passed by a second vehicle at high relative speed, noises and turbulences may arise that could startle a driver of the first vehicle. This may not only be a nuisance for the driver and the other occupants but could also pose a safety risk due to the unexpected noise and cross-forces acting on the first vehicle.

Existing assistance systems are usually not tailored for this issue and are therefore ineffective. For example, traditional (non V2X-based) cross-force stabilization systems (e.g., VW side-wind assist) use lateral force sensors readings to correct undesired lateral movement of the vehicle due to wind. However, these systems can react only when lateral movement is detected and hence cannot totally eliminate discomfort of the driver. A proactive approach to prevent negative effects would be more desirable in this regard.

V2X-based systems are increasingly suggested, e.g., DE 10 2018 112 773 A1 or DE 10 2020 108 999 A1, that use lateral wind-force/direction estimations. However, these are not suitable for short-lived turbulences caused by passing vehicles.

SUMMARY

The present invention relates to a method and a system for active and selective preventive cross-force and noise control in a vehicle. Particular embodiments relate to a method and a system for active and selective preventive cross-force and noise control in a vehicle being passed by another vehicle as well as to a vehicle with such a system.

In light of the above, there is a need to find proactive solutions for counteracting noise and cross-forces stemming from passing vehicles.

According to one embodiment of the invention, a method for active and selective preventive cross-force and noise control in a vehicle being passed by another vehicle comprises determining driving parameters of a potentially disturbing other vehicle foreseeably passing by the vehicle, wherein a prognostic time-dependent path of the other vehicle is estimated based on the current driving parameters of the other vehicle, determining cross-force and/or noise characteristics caused by the other vehicle, calculating a time window for a drive-by of the other vehicle based on the driving parameters and determining compensating measures to be taken by the vehicle to reduce cross-forces and/or noise expected during drive-by of the other vehicle based on the determined cross-force and/or noise characteristics, and executing the determined compensating measures by the vehicle in the estimated time window during drive-by of the other vehicle.

According to another embodiment of the invention, a system for active and selective preventive cross-force and noise control in a vehicle being passed by another vehicle comprises a measuring system configured to determine driving parameters of a potentially disturbing other vehicle foreseeably passing by the vehicle and cross-force and/or noise characteristics caused by the other vehicle, wherein a prognostic time-dependent path of the other vehicle is estimated based on the current driving parameters of the other vehicle, a calculation unit configured to calculate a time window for a drive-by of the other vehicle based on the driving parameters and to determine compensating measures to be taken by the vehicle to reduce cross-forces and/or noise expected during drive-by of the other vehicle based on the determined cross-force and/or noise characteristics, and a control unit configured to execute the determined compensating measures in the estimated time window during drive-by of the other vehicle.

According to yet another embodiment of the invention, a vehicle comprises a system according to embodiments of the invention.

One embodiment of the present invention provides a predictive approach for estimating, characterizing and compensating cross-forces and noise caused by passing vehicles exclusively at selected future time windows before these effects are experienced by driver and/or passengers. To this end, the invention relies on cross-force/noise estimations, e.g., as received from other vehicles and/or from measuring entities distributed across the infrastructure, to calculate suitable countermeasure(s) to compensate them. Moreover, the invention relies on an estimation of the dynamics of passing vehicles, e.g., as received from other vehicles and/or from measuring entities distributed along the infrastructure, to predict a time window in the near future where these effects are expected to be experienced. The calculated countermeasures are selectively applied only in the predicted time window, ideally such that a driver and passengers will not notice any effect.

Due to this predictive approach, embodiments of the invention are able to proactively prevent discomfort (e.g., surprise or fright due to sudden noise or side movement of the vehicle) and safety risks (e.g., uncontrolled countersteering) and hence increase safety and driving comfort. In the ideal case, passengers and the driver would not even notice that the vehicle is applying force or noise compensation.

Embodiments of the invention can also be used to cancel out noise for the driver because the countermeasures are only applied in a short selected time window. Consequently, comfort and safety can be improved for all occupants of a vehicle. The present approach is able to compensate effects caused by any type of vehicle. In particular, the passing vehicle does not necessarily have to be equipped with V2X equipment. The present approach is thus very generic and ensures better applicability than prior art systems.

It is understood that the term "vehicle" or "vehicular" or other similar term as used herein is inclusive of vehicles in general such as passenger automobiles including sport utility vehicles (SUVs), buses, trucks, various commercial vehicles, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Advantageous embodiments and improvements of the present invention are found in the subordinate claims.

According to an embodiment of the invention, the method may further comprise wirelessly communicating the driving parameters and the cross-force and/or noise characteristics of the other vehicle to the vehicle. Correspondingly, the system may further comprise a communication unit configured to wirelessly communicate the driving parameters and the cross-force and/or noise characteristics between vehicles.

In particular, V2X communication between vehicles (V2V) and between vehicles and the infrastructure (V2I) may be used to distribute information about a high-speed vehicle to the other vehicles and inform them accordingly such that they are able to initiate adequate countermeasures to proactively avoid any undesired effect on the occupants within the time interval when the fast vehicle is driving by.

According to an embodiment of the invention, at least one of the driving parameters and the cross-force and/or noise characteristics of the other vehicle may be determined by a measuring vehicle passed by earlier by the other vehicle.

Hence, the predictive approach may particularly use sensors installed on other vehicles and V2X communications to help vehicles prevent undesired effects caused by passing vehicles (sudden cross-forces/turbulences and noise). Noise and cross-force may be sensed and characterized, for example, by a vehicle that has just been passed by another vehicle and then transmitted and shared via V2X to the surrounding vehicles. Detected dynamics of the passing vehicle may also be determined and shared. At the receiving vehicles, the received data may then be used to calculate time windows when to selectively apply which compensating measures (cross-force stabilization and/or noise cancellation).

Alternatively, or additionally, at least one of the driving parameters and the cross-force and/or noise characteristics of the other vehicle may be measured by an infrastructure unit.

These data may then be shared via wireless communication (e.g., V2X) with the vehicles in the vicinity as mentioned before. For example, sensor units may be placed along or close by a street in order to monitor the lanes for high-speed and/or large vehicles that may cause turbulences and/or noise in case they pass other vehicles. These sensor units may measure current position and dynamical parameters (speed, acceleration, direction of movement) as well as size and/or vehicle type of each vehicle in order to assess whether the respective vehicle is about to pass another vehicle and whether this will likely be accompanied by noise and/or lateral forces of relevant size. V2X communication units may be placed along the road to share the computed data to the surrounding vehicles.

According to an embodiment of the invention, the compensating measures may comprise generating a cross-force stabilization with a driving unit of the vehicle based on the cross-force characteristics. The system may correspondingly comprise a driving unit configured to generate a cross-force stabilization based on the cross-force characteristics.

Possible countermeasures include, for example, increasing steering stiffness on straight roads if expected cross-forces are above a threshold, correcting and/or countersteering undesired lateral movements of the vehicle, acting on differential or brakes in curves if expected cross-forces are above a threshold and so on. The exact scale of the countermeasures may be computed using the received cross-force and noise profiles and according to the current status (position, dynamics) of the receiving vehicle.

The compensating measures may also comprise generating an anti-noise signal with an acoustic signal generator inside a cabin of the vehicle, the anti-noise signal being configured on the basis of the communicated noise characteristics to reduce the acoustic noise in at least a portion of the cabin of the vehicle by destructive interference. The system may correspondingly comprise an acoustic signal generator configured to generate an anti-noise signal inside a cabin of the vehicle, the anti-noise signal being configured on the basis of the communicated noise characteristics to reduce the acoustic noise in at least a portion of the cabin of the vehicle by destructive interference.

This effectively provides a feed-forward controlled active noise cancellation for vehicles that are about to be passed by another vehicle. The approach relies on the insight that vehicles may monitor noise emissions of other vehicles and may share this information with the other vehicles in their immediate vicinity in a wireless way, e.g., via V2X technology. The relevant sound data may be distributed via V2V to vehicles driving in the vicinity, e.g., in the front or on an adjacent lane, which may then take the data into account for an improved noise cancellation inside their passenger cabins even before the sound causing vehicle actually arrives at their current position.

According to an embodiment of the invention, the compensating measures may be accompanied by an alarm signal to the driver of the vehicle that another vehicle is about to pass by. The system may correspondingly comprise a driver interface configured to release an alarm signal that another vehicle is about to pass by.

For example, in case a first vehicle experiences sudden and undesired turbulence and/or noise due to a passing vehicle, it may assess cross-force and noise variations during the drive-by phase. As soon as the drive-by is finished (or possibly even when the drive-by is still taking place), the first vehicle may broadcast a dedicated V2X message to all vehicles in the surrounding area. This message may contain amongst others a warning that the high-speed vehicle is about to reach some of the other vehicles.

According to an embodiment of the invention, a threshold may be applied to the determined cross-force and/or noise characteristics of the other vehicle to determine whether the cross-force and/or noise characteristics are to be communicated to the vehicle and/or whether compensating measures need to be taken by the vehicle during the drive-by of the other vehicle. Correspondingly, the measuring system and/or the calculation unit may be configured to apply a threshold to the determined cross-force and/or noise characteristics to determine whether the cross-force and/or noise characteristics are to be communicated and/or whether compensating measures need to be taken by the vehicle during the drive-by of the other vehicle.

Hence, to avoid triggering countermeasures and/or warning signals in arbitrary situations, the extent of the potential disturbances (cross-forces, noise) may be required to be above pre-defined thresholds. More generally, the receiving vehicle may assess the relevance of any received information, e.g., if any undesired effect is going to be experienced locally when being passed by the other vehicle. The receiving vehicle may thus perform various checks before it starts to initiate any countermeasures. Additionally, the vehicle could use its own sensors to better estimate the impact of the other vehicle and accordingly adapt the countermeasures.

The invention will be explained in greater detail with reference to exemplary embodiments depicted in the drawings as appended.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of embodiments of the invention. Other embodiments of the present invention and many of the intended advantages of embodiments of the present invention will be readily appreciated as they become better understood by reference to the following detailed description. The elements of the drawings are not necessarily to scale relative to each other. In the figures, like reference numerals denote like or functionally like components, unless indicated otherwise.

Figure 1:
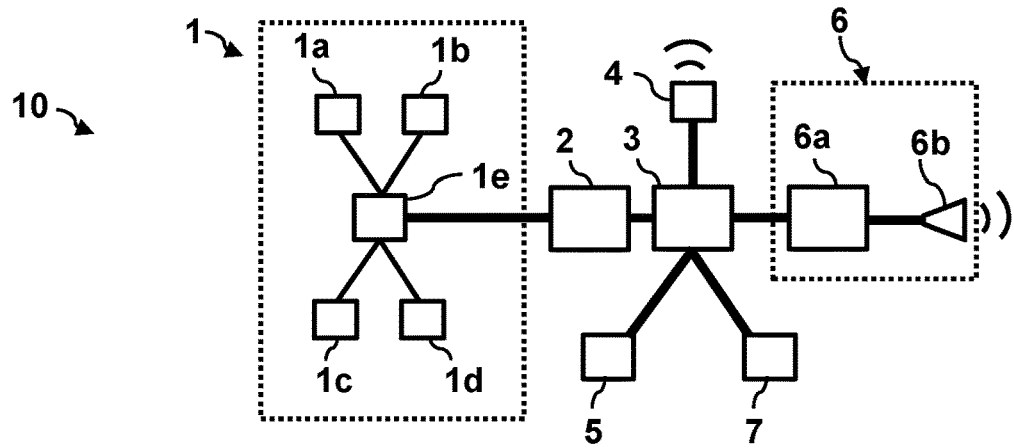
FIG. 1 schematically depicts a system for active and selective preventive cross-force and noise control in a vehicle according to an embodiment of the invention.

Although specific embodiments are illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

The following elements may be described in relation to the appended drawings to describe various features of embodiments of the present invention.

1 measuring system
1a radar
1b lidar
1c sound sensor
1d cross-force sensor
1e sensor control
2 calculation unit
3 control unit
4 communication unit
5 driving unit
6 acoustic signal generator
6a signal generator control
6b loud speaker
7 driver interface
8 infrastructure unit
9 seat
10 system
100 vehicle
101 cabin
102 disturbing other vehicle
CF cross-force
N noise
t time
A-F vehicles
t1, t2 point in time
M method
M1-M5 method steps

DETAILED DESCRIPTION OF ILLUSTRATIVE EMBODIMENTS

Figure 2:
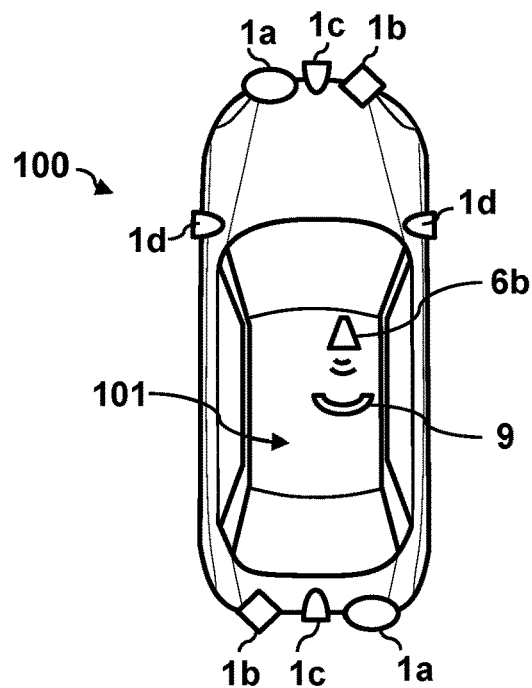
FIG. 2 schematically shows a vehicle comprising the system of FIG. 1.
Figure 3:
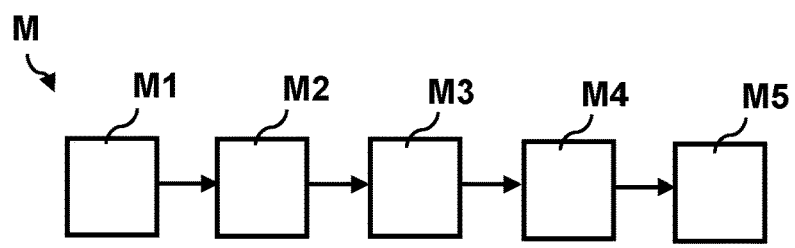
FIG. 3 shows a flow diagram of a method for active preventive cross-force and noise control in the vehicle of FIG. 2 using the system of FIG. 1.

FIG. 1 schematically depicts a system 10 for active and selective preventive cross-force and noise control in a vehicle, e.g., a motor vehicle, 100 according to an embodiment of the invention. FIG. 2 shows the vehicle 100 comprising the system 10 of FIG. 1. FIG. 3 shows a flow diagram of a corresponding method M for active preventive cross-force and noise control in the vehicle 100.

The system 10 is configured to perform cross-force stabilization of the vehicle 100 as well as active noise control inside a passenger cabin 101 of the vehicle 100, also known as noise cancellation or active noise reduction, for a selected time interval in a case that the vehicle 100 is passed by another vehicle 102 in order to minimize or completely eliminate any potentially annoying effects on the occupants of the vehicle 100 during the time interval of the drive-by, e.g., due to turbulences caused by high relative speeds or large relative dimensions of the other vehicle 102, etc.

To this end, the vehicle 100 communicates with other vehicles wo equipped with such systems 10 as well as with infrastructure units 8 distributed along the road by means of a wireless V2X communication link. Via this communication link, the vehicles wo exchange data on (potentially) disturbing other vehicles 102, which may or may not be equipped with such a system 10, including information on experienced and expected cross-forces and noise as well as on the dynamics of the respective disturbing vehicles 102, that is, their position, speed and projected driving path amongst others. These data are then taken into account by the receiving vehicles wo for initiating adequate counter measures during a projected time interval the disturbing vehicle 102 is likely to drive by the respective receiving vehicle 100.

It is to be understood in this respect that the (potentially) disturbing other vehicle 102, i.e., the vehicle causing noise and turbulences, does not necessarily need to be equipped with a system 10 according to embodiments of the invention. The disturbing vehicle 102 may in fact not even be equipped with V2X and/or sensor devices at all. In general, it can be basically any other vehicle.

The system 10 may be part of a computing system of the vehicle 100, e.g., of an advanced driver assistance system (ADAS), and may be controlled to this end by a control unit 3. The system 10 may generally be configured to scan a traffic environment around the vehicle 100. To this end, the vehicle 100 may be equipped with various sensor technologies as they are utilized in modern vehicles, in particular in assisted and/or autonomous driving systems, e.g., sensors to sense other vehicles, pedestrians, bicycles and other traffic participants and/or objects (e.g., cameras, ultrasonic sensors, etc.) and with wireless communication equipment for V2X communication.

With reference to FIGS. 1 and 2, the system 10 specifically comprises a measuring system 1 controlled by sensor control 1e and configured to determine driving parameters of other vehicles 102 passing or driving close by, e.g., position, speed, acceleration, direction of movement and so on. To this end, the system 10 may be equipped with various sensor elements comprising amongst others one or several radar 1a and lidar 1b. It is to be understood that the system 10 may also comprise further sensor elements that are not depicted here, e.g., one or several cameras.

Based on these data, a prognostic time-dependent path of each passing vehicle 102 may be estimated in order to estimate whether each vehicle 102 may come close to other vehicles wo in the near future, thereby potentially disturbing and/or startling the occupants of these vehicles 100, e.g., due to noise based on high speed differences. This can become an issue in particular in the case that a driver is surprised by a passing vehicle 102.

The measuring system 1 further comprises one or several sound sensors 1c to measure noise characteristics caused by any passing vehicle 102. For example, a plurality of microphones may be distributed over a body of the vehicle 100. In the particular example of FIG. 2, the vehicle 100 comprises a sound sensor 1c at a backside and a sound sensor 1c at a frontside. The sound sensors 1c may measure noise or any acoustic information emitted by other vehicles 102 close by the vehicle 100. It is to be understood that the depicted configuration of sound sensors 1c and other sensors is merely an example. The person of skill will readily conceive various other configurations of one or several sound sensors, e.g., directional microphones.

The measuring system 1 further comprises one or several cross-force sensors 1d, e.g., lateral force or pressure sensors, configured to determine cross-force characteristics of any passing vehicle 102 in order to assess whether the passing vehicle 102 generates turbulences and the associated lateral pressure differences and cross-forces due to large relative speed and/or size differences.

The system 10 further comprises a communication unit 4 coupled with the control unit 3 and the measuring system 1 and configured to wirelessly communicate the driving parameters and the cross-force and/or noise characteristics from the vehicle 100 to other vehicles 100 via V2X communication.

Hence, when the vehicle 100 experiences sudden and undesired turbulence and/or noise due to another vehicle 102 driving by with high relative speed, it may read/log the measured cross-force and noise variation during the drive-by phase. As soon as the drive-by is complete (or even before that), it may broadcast a dedicated V2X message to all or all relevant vehicles 100 in the immediate surrounding area. The message may contain amongst others a warning signal about the disturbing vehicle 102 passing by, measured profiles of the experienced cross-force and/or noise during the drive-by phase, current position and dynamics (speed, acceleration, heading) of the disturbing vehicle, as well as the relative position and dynamics of the disturbing vehicle 102 compared to the overtaken vehicle 100 during the drive-by.

Hence, other vehicles 100 can get constantly updated about any potentially disturbing vehicle 102 foreseeably passing by and the expected cross-force and/or noise characteristics caused by that vehicle 102.

In order to be able to react properly to such warnings in the case that the vehicle wo is informed by other vehicles wo about an incoming vehicle 102, the system 10 further comprises a calculation unit 2 configured to calculate a time window for a drive-by of the potentially disturbing vehicle 102 based on the driving parameters and to determine compensating measures to be taken by the vehicle 100 to reduce cross-forces and/or noise expected during drive-by of the disturbing vehicle 102 based on the determined cross-force and/or noise characteristics (determined in this case by other vehicles wo or by infrastructure units 8).

The control unit 3 of the system 10 is configured to execute the determined compensating measures in the estimated time window during drive-by of the prognostically disturbing vehicle 102.

To this end, the system 10 further comprises a driving unit 5 configured to generate a cross-force stabilization based on the cross-force characteristics, e.g., by adapting steering stiffness, countersteering, etc.

Moreover, the system 10 comprises an acoustic signal generator 6 configured to generate an anti-noise signal inside the cabin 101 of the vehicle wo, the anti-noise signal being configured on the basis of the communicated noise characteristics to reduce the acoustic noise in at least a portion of the cabin 101 of the vehicle 100 by destructive interference.

To this end, the acoustic signal generator 6 comprises a control 6a, which steers one or several loudspeakers 6b for each occupant seat 9 inside the cabin 101. The loudspeakers 6b may for example be directly integrated in the seats 9 of the vehicle 100. However, in other configurations one or several loudspeakers 6b may also be installed somewhere else inside the cabin 101, e.g., at a control panel, on a sidewall, in a roof, and so on. An acoustic noise signal is superimposed with an anti-noise signal with inverted phase and appropriately chosen amplitude such that the acoustic noise signal is reduced or completely cancelled by destructive interference.

The system 10 further comprises a driver interface 7 configured to release an alarm signal that another vehicle 102 is about to pass by, e.g., a visual signal on a control panel of the vehicle 100 and/or an acoustic signal.

In order to make sure that only relevant cases are considered, the measuring system 1 and/or the calculation unit 2 may be configured to apply a threshold to the determined cross-force and/or noise characteristics to establish whether the cross-force and/or noise characteristics are to be communicated and/or whether compensating measures need to be taken by the vehicle 100 during the drive-by of the other vehicle 102.

The corresponding method M comprises with reference to FIG. 3 under M1 determining the driving parameters of a potentially disturbing other vehicle 102 foreseeably passing by the vehicle 100, under M2 determining the cross-force and/or noise characteristics caused by the disturbing vehicle 102, under M3 wirelessly communicating the driving parameters and the cross-force and/or noise characteristics caused by the disturbing vehicle 102 to the vehicle 100 (e.g., from a measuring vehicle 100 and/or from an infrastructure unit 8), under M4 calculating the time window for a drive-by of the disturbing vehicle 102 based on the driving parameters and determining compensating measures to be taken by the vehicle 100 to reduce cross-forces and/or noise expected during drive-by of the disturbing vehicle 102 based on the determined cross-force and/or noise characteristics, and finally under M5 executing the determined compensating measures by the vehicle 100 in the estimated time window during drive-by of the disturbing vehicle 102.

An exemplary driving situation is now described with reference to FIGS. 4 to 6.

Figure 4:
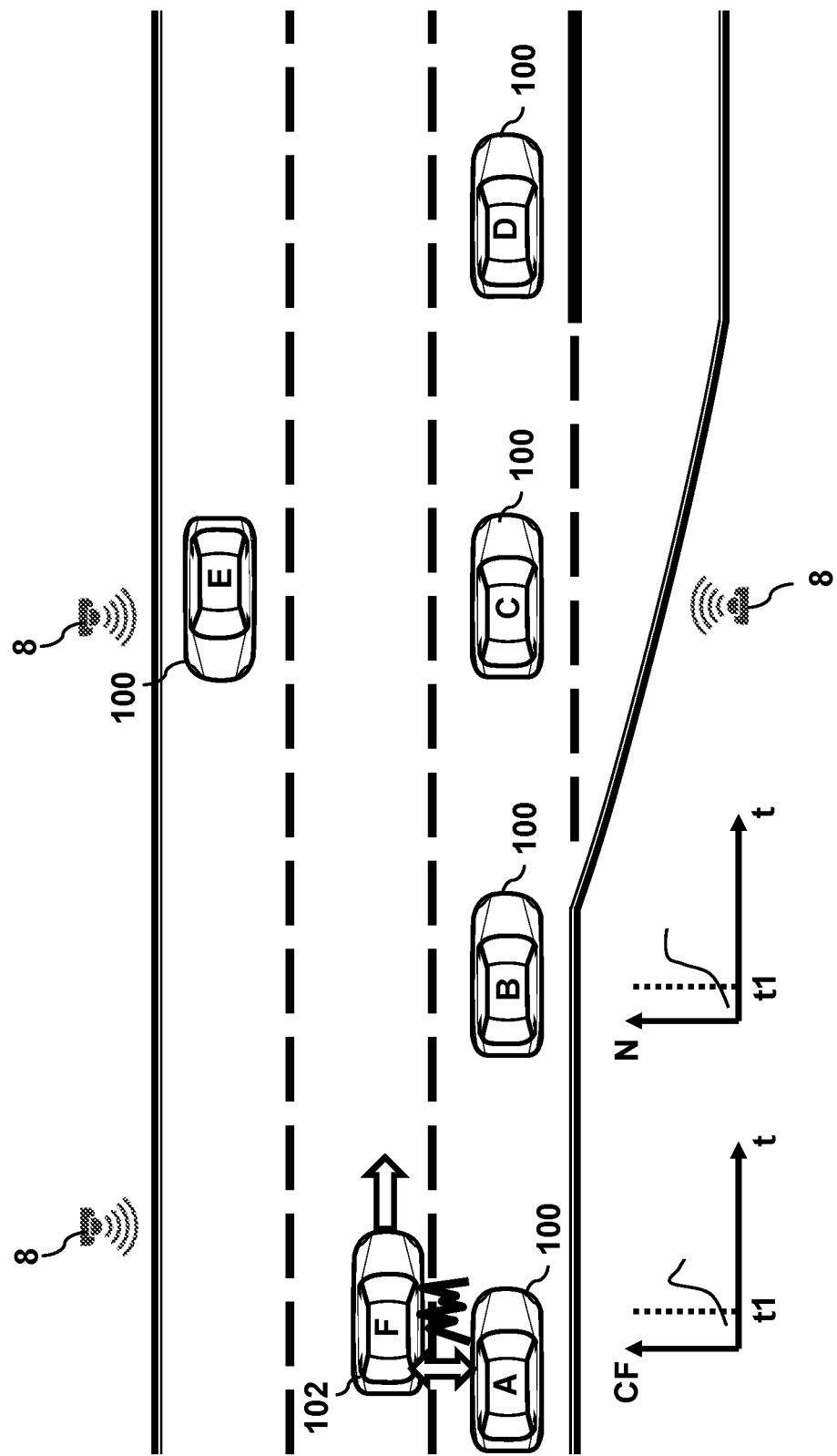
FIGS. 4 to 6 depict an exemplary driving scenario using the system of FIGS. 1 to 3.

As can be seen in FIG. 4, vehicle A, which is equipped with the system 10 described in FIGS. 1 to 3, is passed by vehicle F under high relative speed such that turbulences and corresponding cross-forces as well as noise is experienced by vehicle A (starting at time t1). Vehicle A monitors the corresponding data of this drive-by, namely the cross-force CF as a function of time t and the noise N as a function of time t (see graphs on the lower left) until the passing maneuver is finished (at time t2, cf. FIG. 5). Moreover, vehicle A collects data on the driving parameters of vehicle F, comprising amongst others relative and absolute position and speed as well as the direction of travel.

Optionally, or additionally, this sensing and logging part can be performed by infrastructure units 8 deployed along the roadside (e.g., at concrete/metal barriers). The logging part could be also done by dedicated units in the cloud or by mobile edge computing stations. In the case of sensing by the road infrastructure, communication could be done by infrastructure units (DSRC- or cellular 4G/5G-based).

Figure 5:
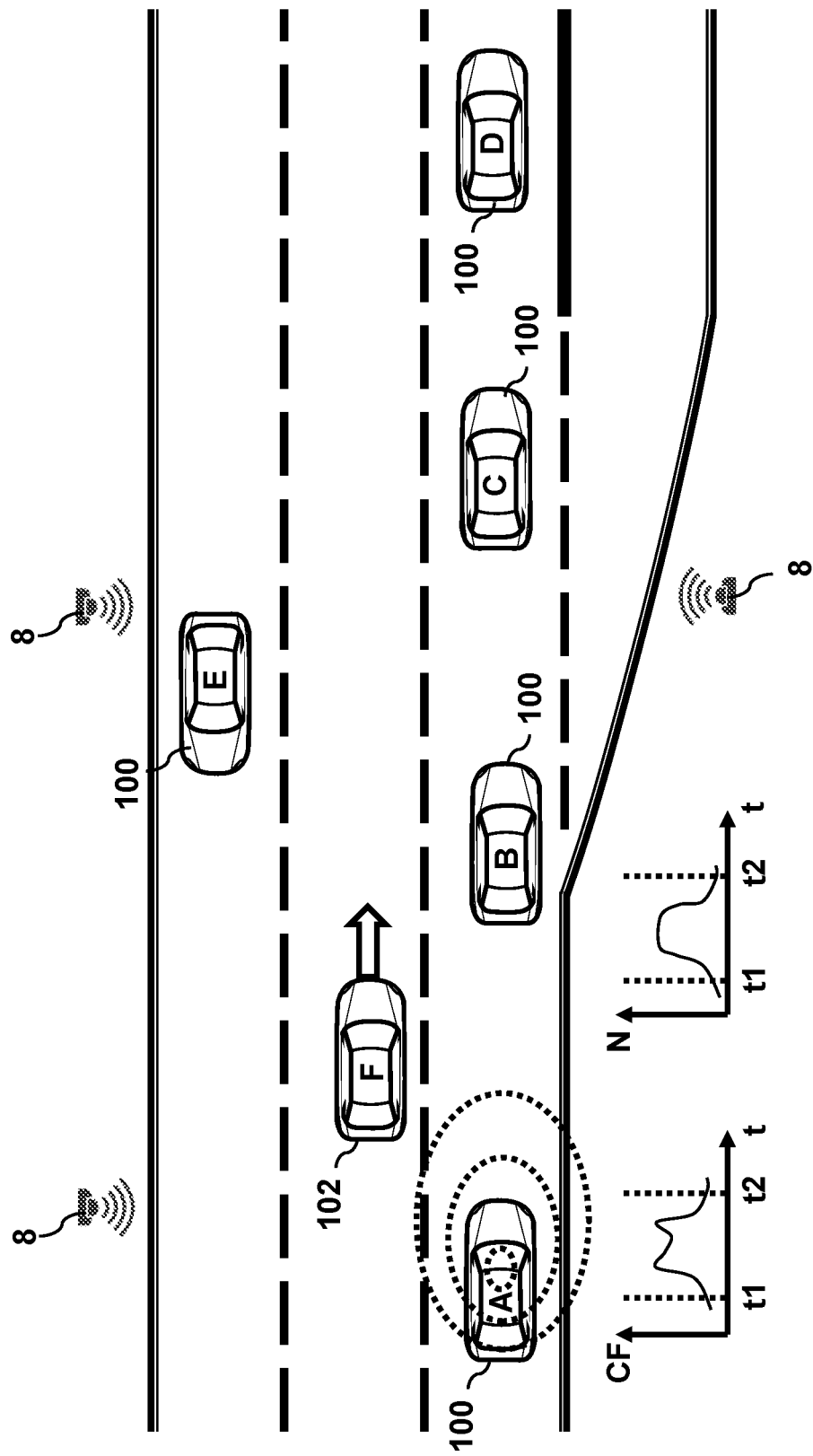

Coming now to FIG. 5, vehicle A sends out a V2X communication informing the other vehicles B-E in the vicinity about potentially disturbing vehicle F. This message may include a warning/hazard signal as well as the relevant data including driving parameters of vehicle F and the experienced cross-force and noise characteristics.

Receiving vehicles B to E may first check the relevance of the received information. For example, they may check against their own position and dynamics to calculate the relevance of the received information (i.e., if similar undesired cross-force and noise effects are also going to be experienced locally at their position when meeting vehicle F). A non-exhaustive list of relevance check calculation methods may comprise:
  vehicle F will be met on the same physical road,
  vehicle F will be met when driving in an adjacent lane without physical road separation,
  vehicle F will be met within a time threshold Δt, and its dynamics will most likely stay the same as those that caused undesired effects on vehicle A,
  vehicle F will be met with the same lateral separation and relative dynamics as those that caused undesired effects on vehicle A, or
  vehicle F will be met with a different relative position and dynamics as those that caused undesired effects on vehicle A, but that are expected to cause similar or even stronger effects (e.g., smaller lateral separation and/or higher relative speed at the meeting point).

If the overall relevance check is positive, the respective receiving vehicle B to E computes a time window where preventive countermeasures will be selectively applied (i.e., only during the period where vehicle F is passing by) and the most suitable counter-force and counter-noise. These values are computed using the received cross-force and noise profiles experienced by vehicle A and according to the current status (position, dynamics) of the receiving vehicle B to E. Additionally, these values may be refined and adjusted by the vehicle B to E using its own sensor estimations when the disturbing vehicle F gets closer and/or directly before it passes by. Exemplary countermeasures may comprise, amongst others, increasing the steering stiffness, acting on differential or brakes, and applying counternoise. As soon as the estimated time window of the drive-by is entered by the respective vehicle B to E, the determined countermeasures are applied.

In the example of FIG. 5, vehicles B, D and E may conclude that they will not be affected by vehicle F relevantly and may therefore refrain from taking any action. For example, vehicle F may not be relevant for vehicle B because the latter is planning to leave the road at the next exit. Or, for example, vehicle E may have a lateral distance that is large enough so that noise and cross-forces may be neglected. Vehicle C on the other hand may be affected by vehicle F, and therefore should prepare adequate counter measures.

Figure 6:
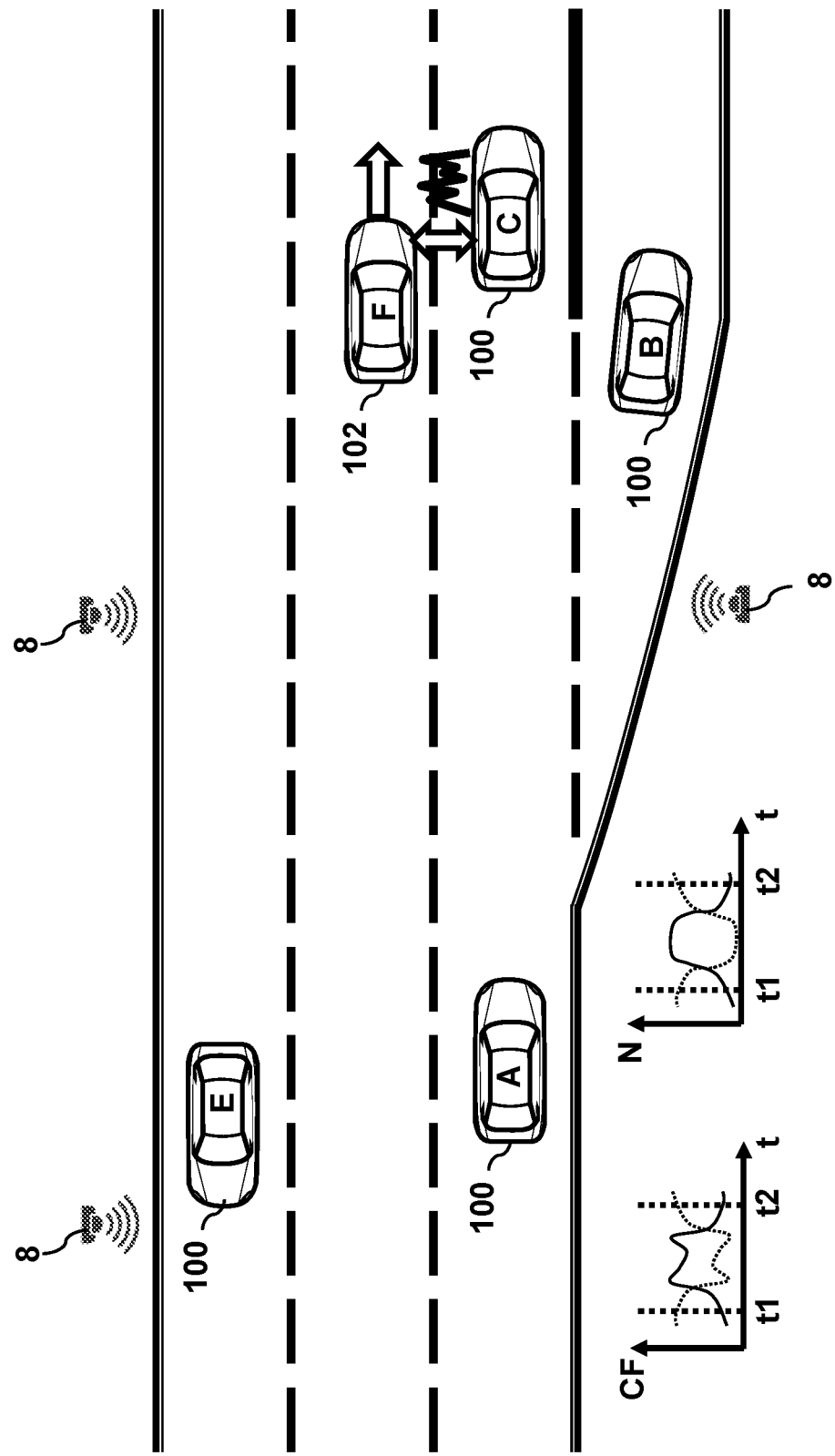

This can be exemplarily seen in FIG. 6, where vehicle F has now reached vehicle C and begins to drive by it. Vehicle C has thus already started to apply adequate countermeasures as mentioned above to compensate the expected occurring cross-forces and noise (cf. dashed curves in the graphs on the lower left). Hence, any potential effect of the drive-by process can then be mitigated or even completely suppressed by the countermeasures of vehicle C, thereby improving comfort and safety during driving for the occupants of vehicle C.

In the foregoing detailed description, various features are grouped together in one or more examples with the purpose of streamlining the disclosure. It is to be understood that the above description is intended to be illustrative, and not restrictive. It is intended to cover all alternatives, modifications and equivalents of the different features and embodiments. Many other examples will be apparent to one skilled in the art upon reviewing the above specification. The embodiments were chosen and described in order to explain the principles of the invention and its practical applications, to thereby enable others skilled in the art to utilize the invention and various embodiments with various modifications as are suited to the particular use contemplated.

What is claimed is:

1. A method for active and selective preventive cross-force and noise control in a first vehicle, the method comprising:
  determining current driving parameters of a second vehicle that will foreseeably drive by the first vehicle, wherein a prognostic time-dependent path of the second vehicle is estimated based on the current driving parameters of the second vehicle;
  determining cross-force or noise characteristics caused by the second vehicle, wherein at least one of the driving parameters or the cross-force or noise characteristics of the second vehicle is determined by a third vehicle that was passed by the second vehicle at an earlier time;
  calculating a time window for a drive-by of the second vehicle based on the current driving parameters;
  determining compensating measures to be taken by the first vehicle to reduce cross-forces or noise expected during the drive-by of the second vehicle based on the determined cross-force or noise characteristics; and
  executing the determined compensating measures by the first vehicle in the calculated time window.

2. The method according to claim 1, further comprising wirelessly communicating the current driving parameters and the cross-force or noise characteristics of the second vehicle to the first vehicle.

3. The method according to claim 1, further comprising wirelessly communicating the current driving parameters and the cross-force or noise characteristics of the second vehicle from the third vehicle to the first vehicle.

4. The method according to claim 1, wherein at least one of the driving parameters or the cross-force or noise characteristics of the second vehicle is measured by an infrastructure device.

5. The method according to claim 1, wherein the compensating measures comprise:
  generating a cross-force stabilization of the first vehicle based on the cross-force characteristics; or
  generating an anti-noise signal with an acoustic signal generator inside a cabin of the first vehicle, the anti-noise signal being configured based on communicated noise characteristics to reduce acoustic noise in at least a portion of the cabin of the first vehicle by destructive interference.

6. The method according to claim 1, wherein the compensating measures are accompanied by an alarm signal to a driver of the first vehicle that the second vehicle is about to pass by.

7. The method according to claim 1, further comprising applying a threshold to the determined cross-force or noise characteristics of the second vehicle to determine whether the cross-force or noise characteristics are to be communicated to the first vehicle.

8. The method according to claim 7, further comprising applying the threshold to the determined cross-force or noise characteristics of the second vehicle to determine whether compensating measures need to be taken by the first vehicle during the drive-by of the second vehicle.

9. The method according to claim 1, further comprising applying a threshold to the determined cross-force or noise characteristics of the second vehicle to determine whether compensating measures need to be taken by the first vehicle during the drive-by of the second vehicle.

10. A system for active and selective preventive cross-force and noise control in a first vehicle, the system comprising:
  a measuring system configured to determine current driving parameters of a second vehicle that will foreseeably drive by the first vehicle and to determine cross-force or noise characteristics caused by the second vehicle, wherein a prognostic time-dependent path of the second vehicle is estimated based on the current driving parameters of the second vehicle;
  a controller configured to execute compensating measures in a calculated time window during a drive-by of the second vehicle based on the current driving parameters, the compensating measures to be taken by the first vehicle to reduce cross-forces or noise expected during the drive-by of the second vehicle based on the determined cross-force or noise characteristics; and
  a communicator configured to wirelessly communicate the current driving parameters and the cross-force or noise characteristics between the first vehicle and a third vehicle that was passed by the second vehicle at an earlier time, the driving parameters or the cross-force or noise characteristics of the second vehicle being determined by the third vehicle.

11. The system according to claim 10, further comprising an acoustic signal generator configured to generate an anti-noise signal inside a cabin of the first vehicle, the anti-noise signal being configured based on communicated noise characteristics to reduce acoustic noise in at least a portion of the cabin of the first vehicle by destructive interference.

12. The system according to claim 10, further comprising a control panel configured to provide an alarm signal that the second vehicle is about to pass by.

13. The system according to claim 10, wherein the measuring system is configured to apply a threshold to the determined cross-force or noise characteristics to determine whether the cross-force or noise characteristics are to be communicated.

14. The system according to claim 13, wherein the measuring system is configured to apply the threshold to the determined cross-force or noise characteristics to determine whether compensating measures need to be taken by the first vehicle during the drive-by of the second vehicle.

15. The system according to claim 10, wherein the measuring system is configured to apply a threshold to the determined cross-force or noise characteristics to determine whether compensating measures need to be taken by the first vehicle during the drive-by of the second vehicle.

16. The system according to claim 10, wherein the communicator is configured to wirelessly communicate the cross-force or noise characteristics based on application of a threshold to the determined cross-force or noise characteristics to determine whether the cross-force or noise characteristics are to be communicated.

17. The system according to claim 10, wherein the controller is configured to execute the compensating measures based on application of a threshold to the determined cross-force or noise characteristics to determine whether compensating measures need to be taken by the first vehicle during the drive-by of the second vehicle.

18. A vehicle comprising:
  a measuring system configured to determine current driving parameters of a second vehicle that will foreseeably drive by the vehicle and to determine cross-force or noise characteristics caused by the second vehicle, wherein a prognostic time-dependent path of the second vehicle is estimated based on the current driving parameters of the second vehicle;
  a controller configured to execute compensating measures in a calculated time window during a drive-by of the second vehicle based on the current driving parameters, the compensating measures to be taken by the vehicle to reduce cross-forces or noise expected during the drive-by of the second vehicle based on the determined cross-force or noise characteristics;
  a communicator configured to wirelessly communicate the current driving parameters and the cross-force or noise characteristics between the vehicle and at least one third vehicle that was passed by the second vehicle at an earlier time, the driving parameters or the cross-force or noise characteristics of the second vehicle being determined by the at least one third vehicle; and
  an acoustic signal generator configured to generate an anti-noise signal inside a cabin of the vehicle, the anti-noise signal being configured based on communicated noise characteristics to reduce acoustic noise in at least a portion of the cabin of the vehicle by destructive interference.

19. The vehicle according to claim 18, wherein the measuring system is configured to apply a threshold to the determined cross-force or noise characteristics to determine whether the cross-force or noise characteristics are to be communicated.

20. The vehicle according to claim 18, wherein the communicator is configured to wirelessly communicate the cross-force or noise characteristics based on application of a threshold to the determined cross-force or noise characteristics to determine whether the cross-force or noise characteristics are to be communicated.

* * * * *